United States Patent [19]

Poggio et al.

[11] Patent Number: 5,598,488
[45] Date of Patent: Jan. 28, 1997

[54] OBJECT MOVEMENT ESTIMATOR USING ONE-DIMENSIONAL OPTICAL FLOW

[75] Inventors: Tomaso Poggio, Wellesley, Mass.; John G. Harris, Gainesville, Fla.; Nicola Ancona, Bari, Italy

[73] Assignees: Massachusetts Institute of Technology, Cambridge, Mass.; Technopolis CSATA Novus Ortus, Italy

[21] Appl. No.: 120,591

[22] Filed: Sep. 13, 1993

[51] Int. Cl.$^6$ .............................. G06K 9/64; G06F 17/15
[52] U.S. Cl. .......................... 382/278; 382/279; 382/107
[58] Field of Search ................................. 382/1, 16, 41, 382/278, 279, 107; 348/413, 415, 416; 364/424.01, 424.02, 449

[56] References Cited

U.S. PATENT DOCUMENTS

| | | | |
|---|---|---|---|
| 5,142,361 | 8/1992 | Tayama et al. | 348/416 |
| 5,212,547 | 5/1993 | Otsuki | 348/416 |

FOREIGN PATENT DOCUMENTS 2602602  2/1988  France .

OTHER PUBLICATIONS

Ancoma, N., "A First Step Toward a Temporal Integration of Motion Parameters", IEEE, 1991, pp. 681–686.

Ancona and Poggio, "Optical Flow from 1D Correlation: Application to a simple Time–To–Crash Detector", *Fourth International Conference on Computer Vision*, IEEE Computer Society Press, May 11–14, 1993, Berlin, Germany, pp. 209–214.

Subbarao, "Bounds on Time–to–Collision and Rotational Component from First–Order Derivatives of Image Flow", *Computer Vision, Graphics, and Image Processing 50*, Jun. 1990, Duluth, Minnesota, Academic Press, pp. 329–341.

*Primary Examiner*—Leo Boudreau
*Assistant Examiner*—Matthew C. Bella
*Attorney, Agent, or Firm*—Stuart P. Meyer; Edward J. Radlo

[57] ABSTRACT

An object movement estimator (400) predicts optical flow by estimating changes in sensed images using one-dimensional correlations. Sensed image portions are stored at a first instant of time and compared with sensed image portions at a second instant of time. An optimal flow is estimated by performing a one-dimensional correlation of the sensed image portions at the first and second instants of time, and a time-to-contact is estimated based on the predicted optical flow thus obtained.

6 Claims, 8 Drawing Sheets

5,598,488

OBJECT MOVEMENT ESTIMATOR USING ONE-DIMENSIONAL OPTICAL FLOW

SUBJECT INVENTION

The present invention is a subject invention under contracts N00014-91-J-1270 and N00014-91-J-4038 with the United States Government, and as such the United States Government has rights therein.

FIELD OF THE INVENTION

The present invention relates generally to optical perception using artificial intelligence, and specifically to an improved system and method for estimating the movement between objects using optical flow measurements.

DESCRIPTION OF BACKGROUND ART

Numerous schemes have been proposed to predict the movement of objects relative to one another for navigational and other purposes. Acoustic echoing, for instance, provides an established method of determining the range from one object to another. If one object is approaching another, such ranging measurements can be used to estimate a time-to-contact.

In an environment where optical images of an object are available, a number of techniques have been proposed to model common biological correlation mechanisms for sensing image expansion, rotation, and translation. In such techniques, portions of an image at a first instant of time are compared with portions of the image at a second instant of time, to determine an optical "flow" over time. Correlation techniques are typically used to predict the actual flow, and other established algorithms are used to determine whether the flow suggests a change in distance to the object, translational movement relative to the object, or rotational movement of the object.

Use of such models to predict when an observer and another object will contact one another is particularly useful. Industrial robots, intelligent highway vehicles, and numerous other devices could be improved by being able to predict contact with other objects. U.S. Pat. No. 5,128,874 teaches an obstacle detection system using a combination of binocular stereo vision and laser radar ranging. U.S. Pat. No. 4,905,151 teaches a mobile robot vision system in which a one-dimensional image is processed in conjunction with a priori information about robot velocity to yield optical flow information used to determine distance to an object.

One technique for implementing movement detectors is discussed in Poggio et al., *Green Theorems and Qualitative Properties of the Optical Flow*, MASSACHUSETTS INSTITUTE OF TECHNOLOGY ARTIFICIAL INTELLIGENCE LABORATORY MEMO NO. 1289, MASSACHUSETTS INSTITUTE OF TECHNOLOGY CENTER FOR BIOLOGICAL INFORMATION PROCESSING PAPER NO. 67 (April 1991), incorporated herein by reference. In this technique, algorithms for correlating optical flow elements and integrating the optical flow over a two-dimensional image plane provide data from which the amount of image expansion or rotation may be determined. This technique uses a two-dimensional correlation of two-dimensional image portions, or "patches," to obtain the desired results.

While such a scheme is theoretically robust, two-dimensional correlation of two-dimensional image data is a complex computational task, requiring sophisticated and expensive equipment for real-time results. Thus, with the present state-of-the-art technology, it is found that such a scheme is impractical for use in many desired applications.

Ideally, a simplified technique for estimating image expansion, translation or rotation would require less computational complexity and would be more amenable to practical application. None of the known teachings, however, provides such a technique.

DISCLOSURE OF INVENTION

In accordance with the present invention, a system (400) for predicting time to contact of a first object moving towards a second object uses sensing means (110) affixed to the first object for sensing a number of image portions (150) of the second object, first and a second memories (442, 444) for storing the sensed image portions at different times, a one-dimensional correlation device (404) for estimating optical flow in one dimension by performing a correlation on the sensed image portions stored in the first and second memories, and estimation means (470) for generating an estimate of the time to contact.

In other aspects of the invention, optical flow information is used to estimate rotation or translation of a second object relative to a first object.

In yet another aspect of the invention, a data representation of an optical field flow of an image (140) is compressed using one-dimensional correlation of one-dimensional portions of the image (140).

BEST MODE FOR CARRYING OUT THE INVENTION

Figure 5:
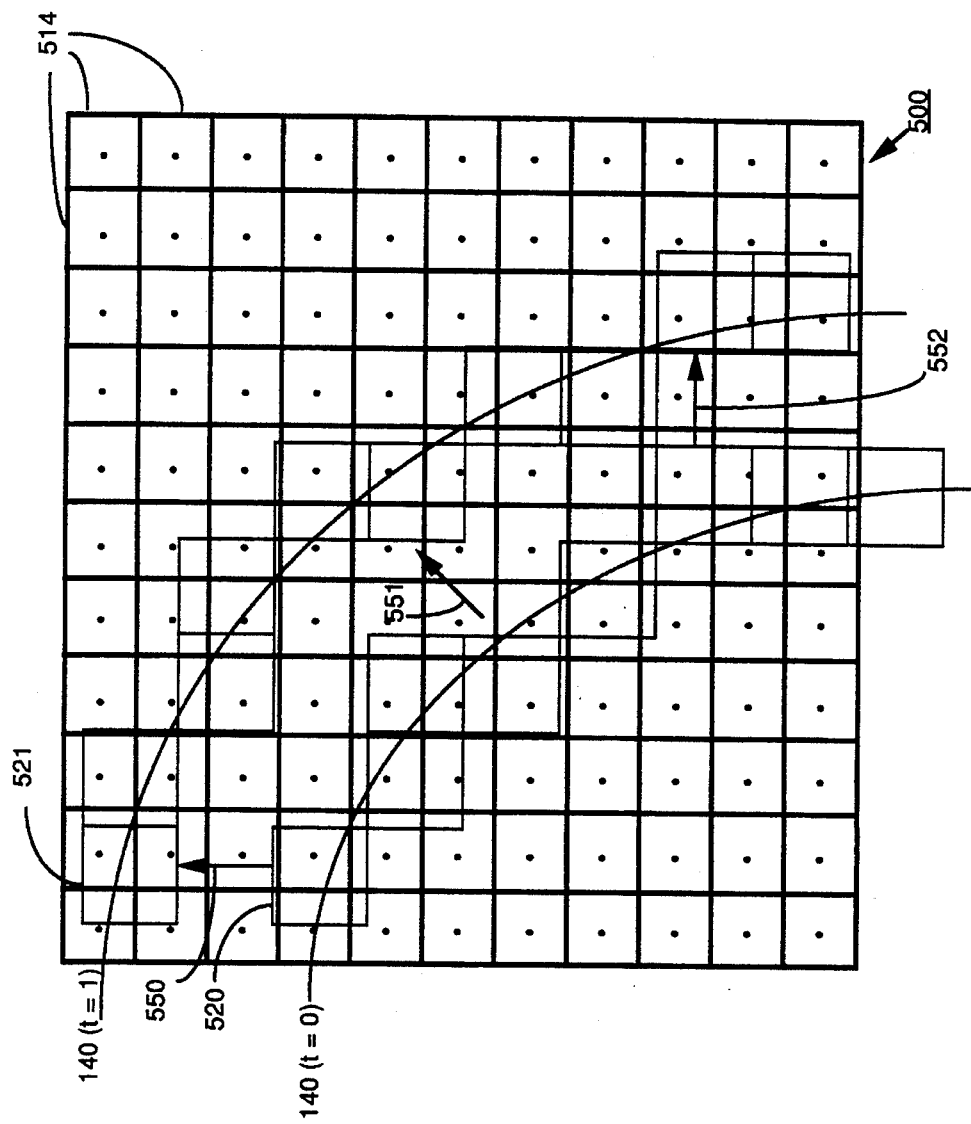
FIG. 5 illustrates a prior art two-dimensional detector for measuring optical flow.

Referring now to FIG. 5, there is shown a prior art two-dimensional detector 500 for measuring optical flow of a small portion of an image 140, comprised of pixels, e.g., 520. Detector 500 is composed of a two-dimensional square array of image sensors, e.g., 514. Typically, such sensors, e.g., 514, are implemented by conventional charge-coupled devices (CCDs) which are conventionally configured to provide pixel signals over a pixel bus (not shown). As an object creating an image 140 comes closer to the detector 500 and the image 140 expands from time t=0 to time t=1, the location on the detector 500 upon which the pixels, e.g., 520, 521, forming the image 140 falls changes, thus changing the signals produced by the sensors, e.g., 514. As described more fully in the technical paper referenced above and in other existing literature, a known method for estimating the expansion is to perform a two-dimensional (vertical and horizontal) correlation of the two-dimensional data provided by detector 500 to obtain a mapping of which image portions, e.g., pixel 520, from time t=0 correspond to image portions, e.g., 521, at time t=1. This mapping provides optical flow information indicative of whether, and how quickly, the object creating image 140 is approaching detector 500. Other known algorithms may then be applied to process this flow information to determine, for instance, a predicted time-to-contact.

Figure 1A:
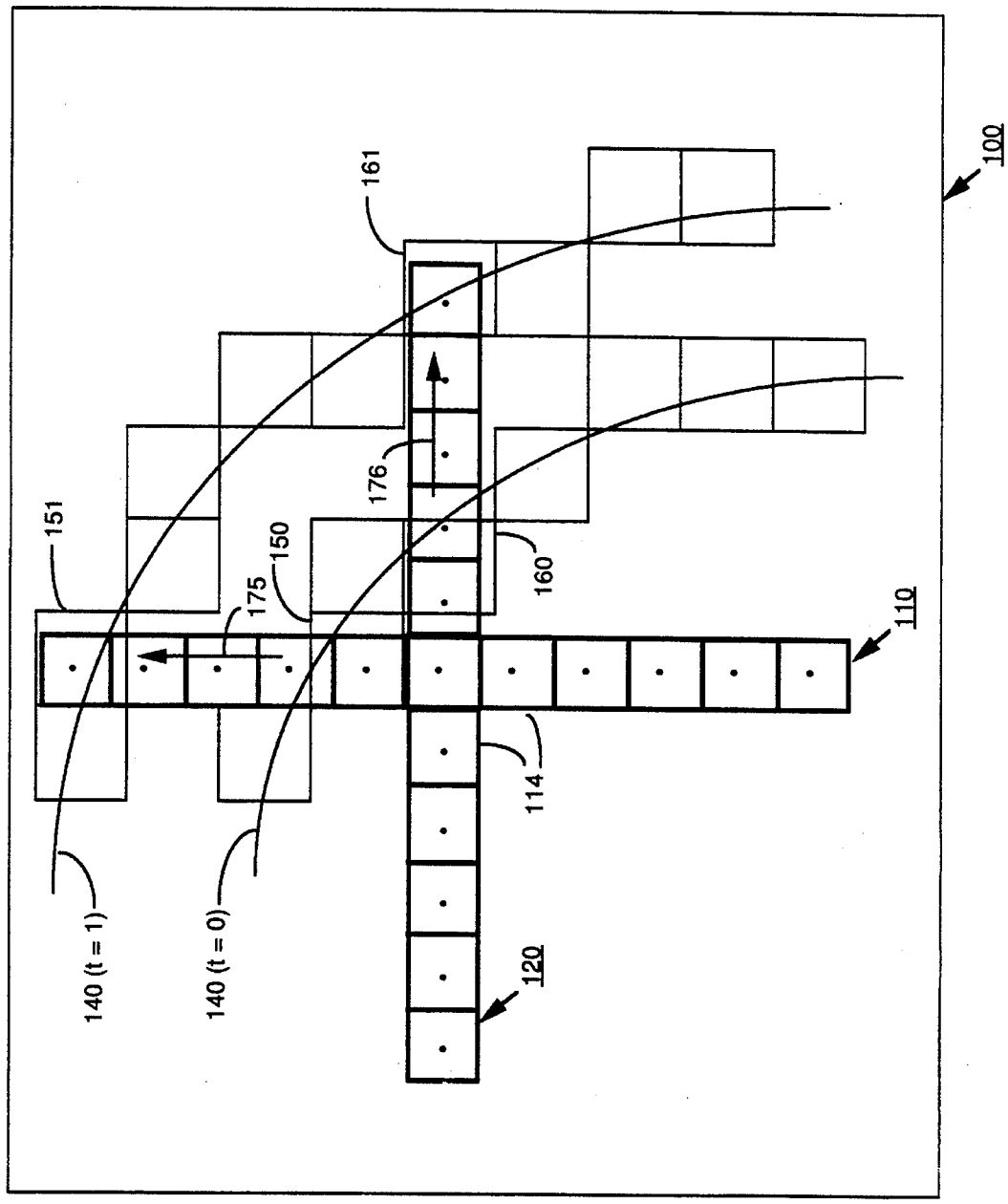
FIG. 1A illustrates a simplified two-dimensional detector for measuring expansion of optical flow in accordance with the present invention.

Referring now to FIG. 1A, there is shown a simplified two-dimensional detector 100 in accordance with the present invention. Unlike the prior art detector 500 illustrated in FIG. 5, the two dimensional detector 100 of FIG. 1A includes only one vertical group 110 of sensors 114, and one horizontal group 120 of sensors 114. As with the detector 500 of FIG. 5, sensors 114 are preferably implemented by CCDs. In accordance with the present invention, such a simplified detector is sufficient because a one-dimensional correlation is used as a substitute for the two-dimensional correlation of known techniques. Specifically, if the horizontal dimension is defined as the x dimension and the vertical dimension is defined as the y dimension, then instead of performing a two-dimensional correlation to determine the (x, y) shift in each portion, e.g., pixel 150, of image 140 from time t=0 to time t=1, a single one-dimensional correlation is performed for that portion, e.g., pixels 150, 151, of the image 140 incident on the vertical group 110 of sensors 114, or a single one-dimensional correlation is performed for that portion of the image 140 incident upon the horizontal group 120 of sensors 114. In the preferred embodiment, the image portions for which such correlations are performed are comprised of individual constituent pixels, e.g., 150, 151, 160, 161, of image 140. It has been found in practice that with appropriate preprocessing, such estimation of the (x,y) shift using one-dimensional correlation provides results that are very close to those obtained using two-dimensional correlation. The one-dimensional correlations of one-dimensional or even two-dimensional patches are computationally far simpler than two-dimensional correlations of two-dimensional patches, and the results are sufficiently close for many desired applications.

Referring still to FIG. 1A and again to FIG. 5, a practical example of a time-to-contact estimator will be described using both two-dimensional and one-dimensional correlation. In the two-dimensional technique, a portion of image 140 at time t=0 is incident upon array 510 of sensors 514. The brightness value of the image at each sensor 514 is measured and stored for later use. Those skilled in the art will recognize that a bit map or any other convenient form may be used to represent this data. At time t=1, the brightness value of the image at each sensor 514 is again measured and represented in bit map or other convenient form. Conventional mathematical processing is then performed as described below to determine a correspondence between image portions at times t=0 and t=1. The correspondence is determined by pairing t=0 image pixels, e.g., 520, with t=1 image pixels, e.g., 521, in a manner that minimizes a difference measure such as the sum of the squared differences in displacement between all such pixels at time t=0 and all such pixels at time t=1. Once this correspondence is established, a vector, e.g., 550 may be defined for each correspondence to indicate the direction and distance of the change of each image portion. In this case, the direction of such vectors, e.g., 550–552 may be horizontal, vertical, or at any angle in between. Such vectors may then be mathematically processed to determine the amount of expansion, rotation or translation of the overall image 140 from time t=0 to t=1. For instance, if the vectors, e.g., 550–552 are primarily divergent over the entire image 140, expansion is indicated. If the vectors, e.g., 550–552 are primarily aligned in one direction over the entire image 140, translation of the image is indicated. If the vectors are primarily aligned tangentially to image 140, rotation is indicated. In the case illustrated in FIG. 5, rotation would not be detectable since the image is generally circular. Such processing may be repeated as often as needed for the application at hand.

Applying the same example to the detector 100 of FIG. 1A, the brightness value at each sensor 114 of the vertical group 110 of sensors is measured and stored at time t=0. The brightness value at each sensor 114 of horizontal group 120 is also measured and stored at time t=0. At time t=1, the brightness value of the image at each sensor 114 of vertical group 110 and horizontal group 120 is again measured. Mathematical processing, as described below, is then performed to determine a correspondence between image pixels, e.g., 150, incident upon vertical group 110 at time t=0 and image pixels, e.g., 151, incident upon vertical group 110 at time t=1. Similarly, processing is performed to determine a correspondence between image pixels, e.g., 160, incident upon horizontal group 120 at time t=0 and image pixels, e.g., 161, incident upon horizontal group 120 at time t=1. Vectors, e.g., 175, 176, are defined from these correspondences to indicate the direction and distance of the change of each image portion. In this case, since the correlation is one-dimensional, the direction of such vectors 175–176 will be either horizontal or vertical, depending on whether the vectors derive from the vertical group 110 or the horizontal group 120.

Figure 1B:
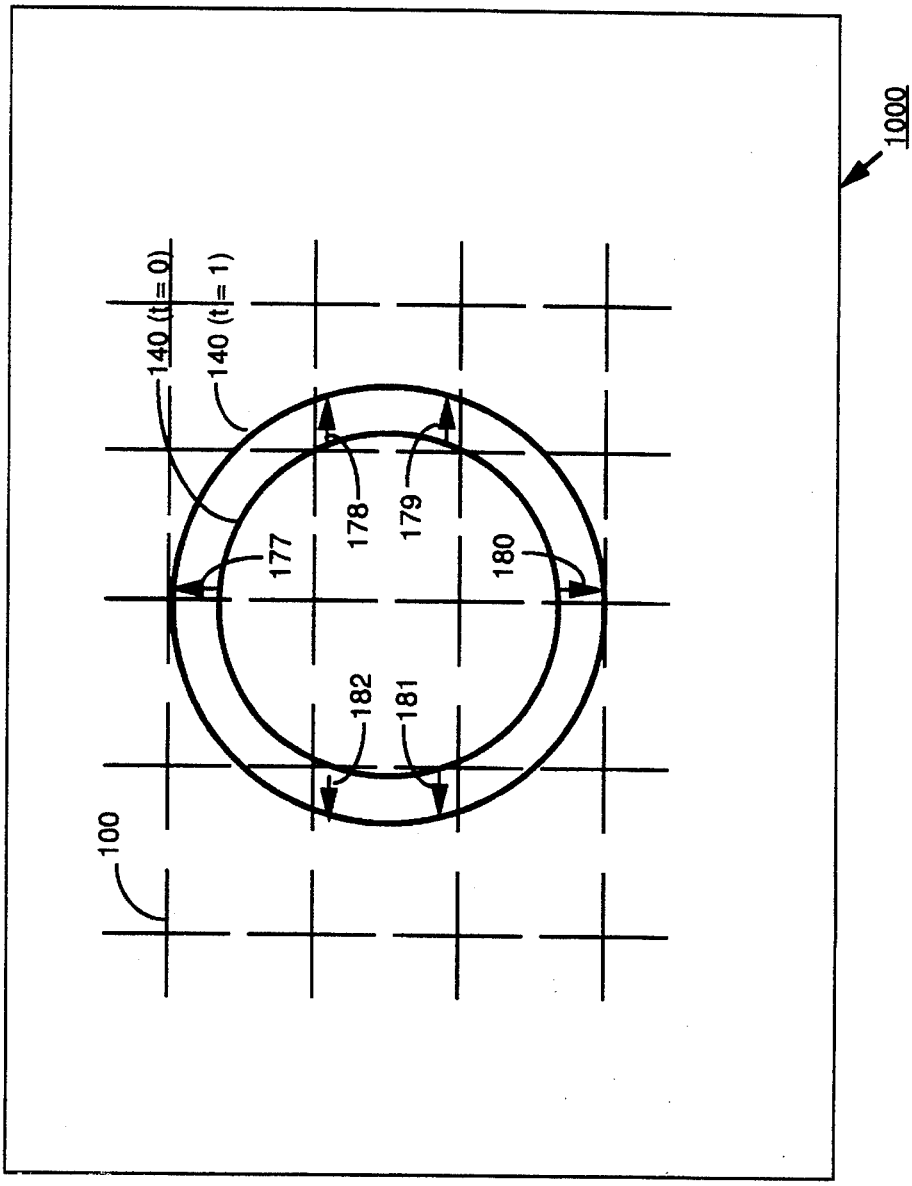
FIG. 1B illustrates an array of two-dimensional detectors in accordance with the present invention.

Referring now to FIG. 1B, there is shown an array 1000 of detectors 100 of the sort illustrated in FIG. 1A. FIG. 1B illustrates vectors 177–182 that are generally divergent with respect to the overall image 140, thus indicating expansion of image 140 from time t=0 to time t=1. Translation of the image 140 would be indicated, for instance, by horizontal vectors, e.g., 178, 182 that are either in the same direction or less strongly divergent than the vertical vectors 177, 180. No translation is indicated in the case illustrated in FIG. 1B. Rotation of an image would not be easily detectable using the array 1000 of FIG. 1B, because the detectors 100 are not configured sufficiently tangentially to image 140 to facilitate detection of rotational image movement.

Figure 1C:
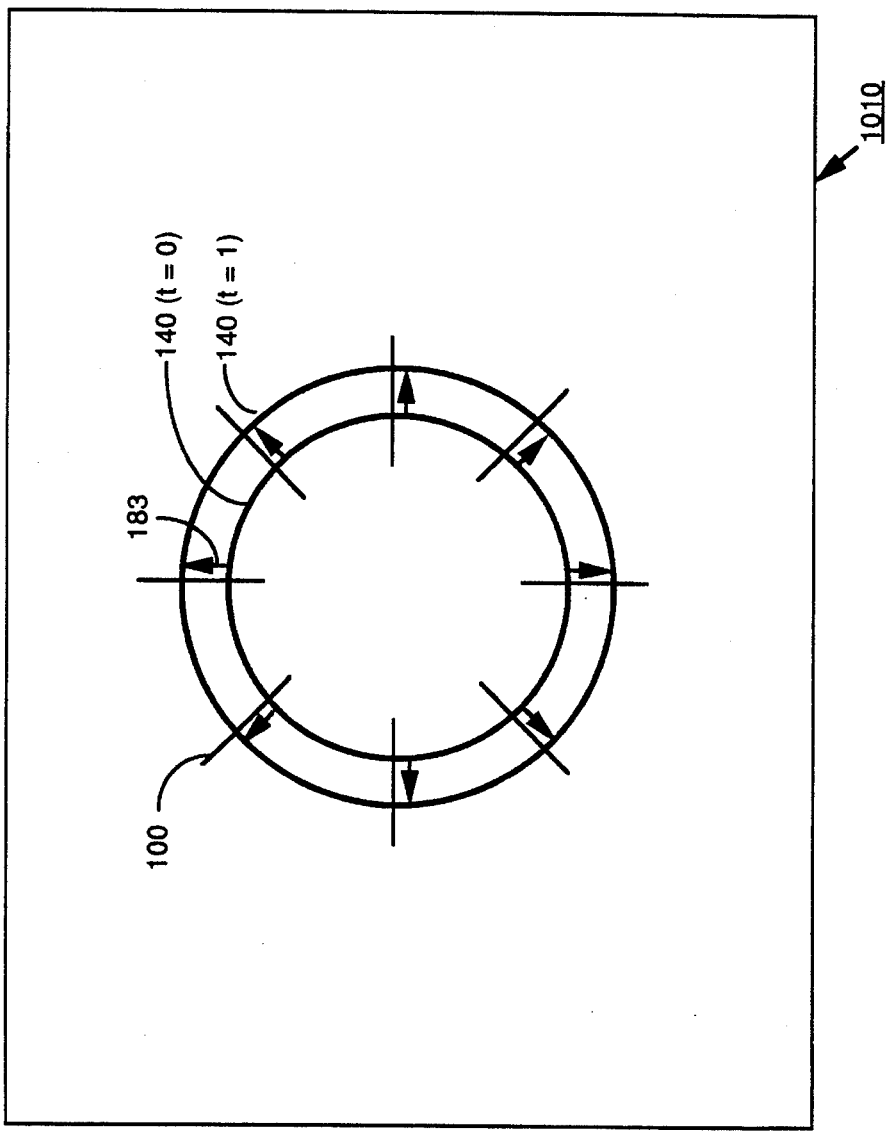
FIG. 1C illustrates an array of one-dimensional detectors in accordance with the present invention.

Referring now to FIG. 1C, there is shown an array 1010 of one-dimensional detectors, e.g., 100, configured to be substantially normal to image 140. If a priori information is available regarding the general shape and location of image 140, then such normally-aligned one dimensional detectors, e.g., 100, provide a simple and inexpensive means for obtaining information regarding the divergence of the image vectors, e.g., 183.

Figure 1D:
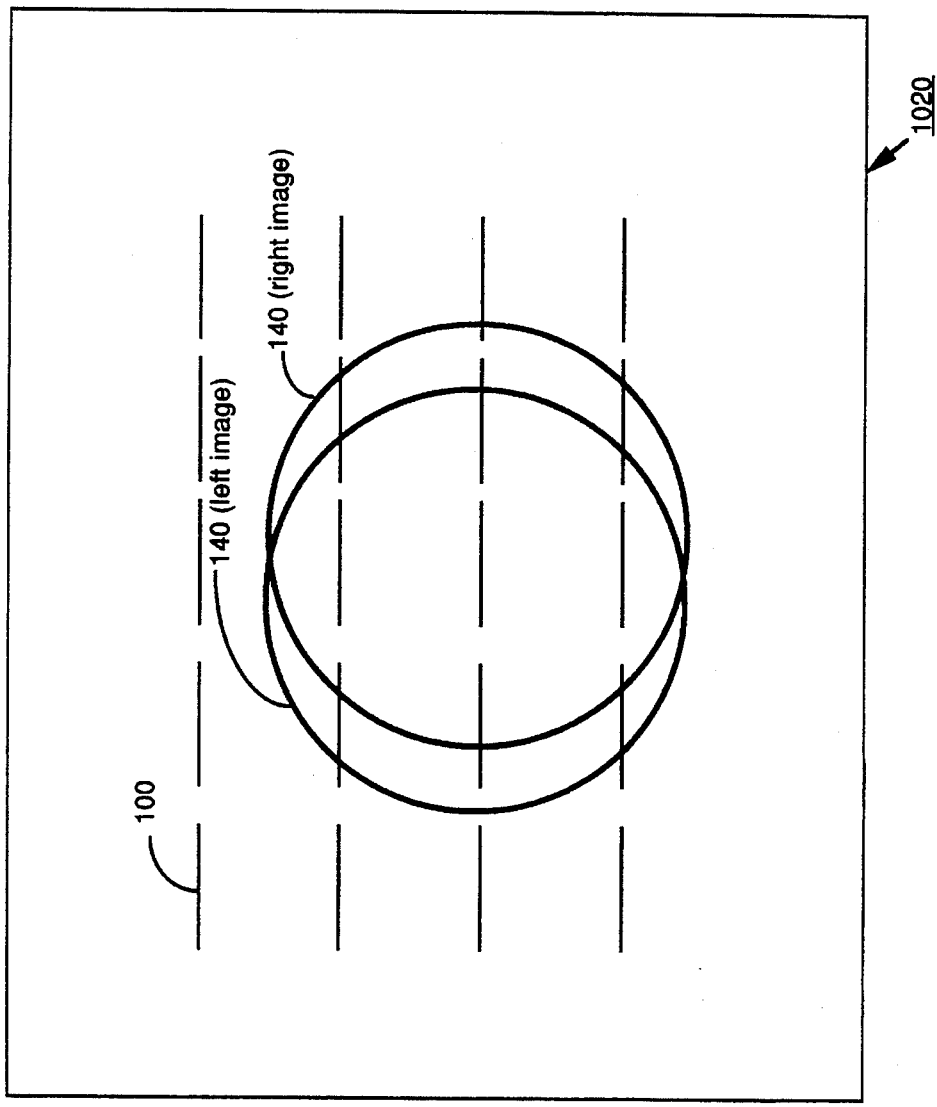
FIG. 1D illustrates an array of one-dimensional detectors configured for stereoscopic detection, in accordance with the present invention.

In an alternate embodiment, apparatus in accordance with the present invention may be applied to detect stereoscopic image components, rather than information on temporal changes, in an image 140. The magnitude of such stereoscopic components may be used to estimate distance to the object creating image 140. Referring to FIG. 1D, an array 1020 of one-dimensional image detectors 100 may be used to analyze two views of an image 140, e.g., a left image from a left imaging apparatus and a right image from a right imaging apparatus. Then, processing may proceed as described below, except that the two sets of image information used as input to the system derive from differences in viewer location rather than temporal differences. Since stereoscopic vision is typically accomplished with horizontally rather than vertically separated imaging apparatuses, one dimensional image detectors 100 as shown in FIG. 1D may effectively be used.

Three types of image translation are typically encountered in the environment of the embodiment described herein. First, translation may occur in a known direction and in a uniform manner. In this situation, the only calculation required is of the speed of translation, which may readily be computed from the responses of one-dimensional detectors of the type illustrated in FIG. 1D.

A second type of translation is uniform translation in an unknown direction. In this situation, both the speed and direction of translation must be determined. This may be accomplished by using apparatus such as that illustrated in FIG. 1B, simply by averaging the responses of all of the motion detectors 100 in the array 1000.

A third type of translation is non-uniform, or arbitrary movement of an image, such as might occur if one approached the object being imaged from an oblique angle. In this case, apparatus such as that illustrated in FIG. 1B may be used, in conjunction with the convolution estimation techniques described below.

Figure 2:
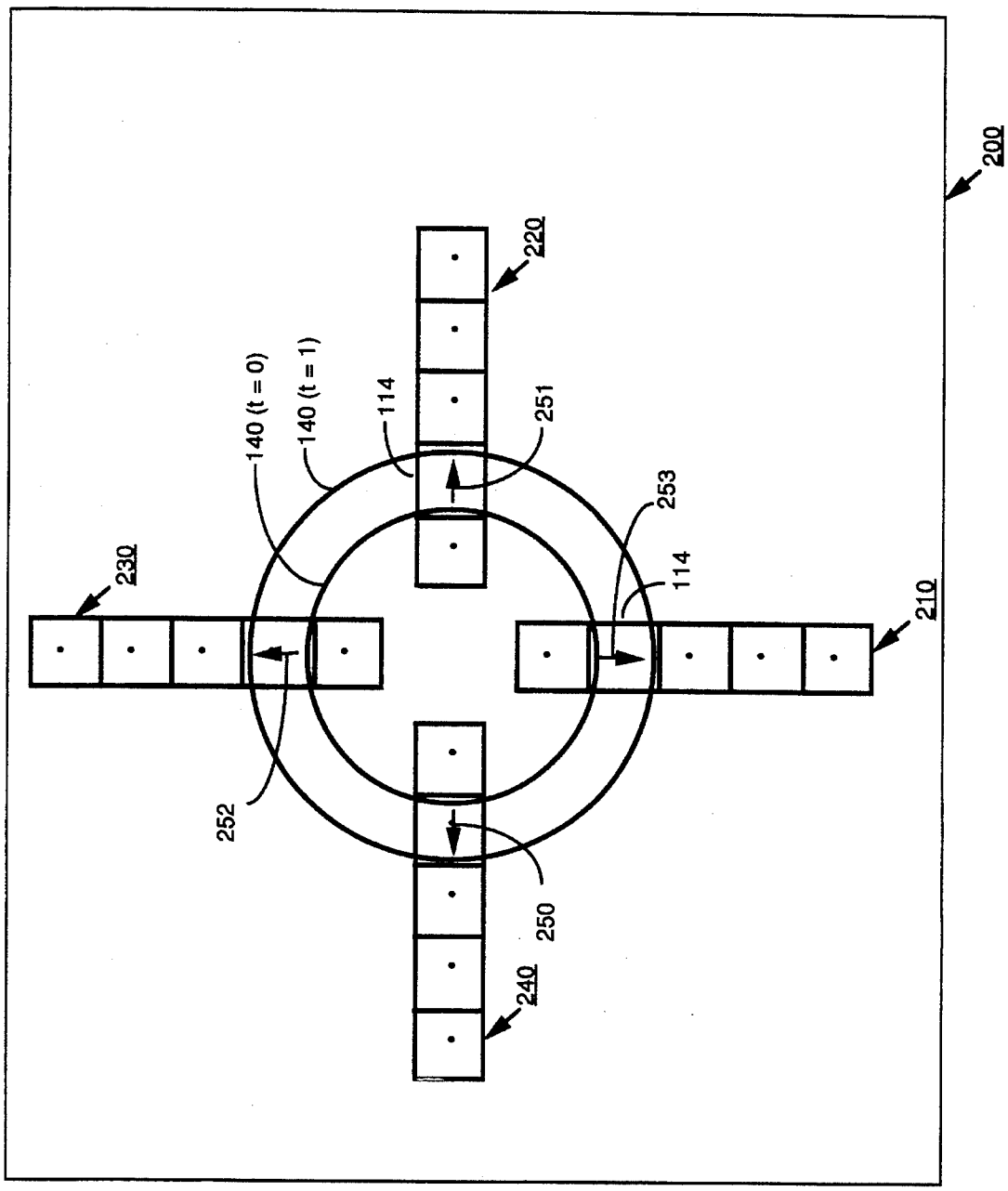
FIG. 2 illustrates a set of simplified one-dimensional detectors for measuring expansion of optical flow in accordance with the present invention.

Referring now to FIG. 2, there is shown another array 200 in accordance with the present invention. Array 200 is made up of four individual one-dimensional detectors, 210, 220, 230, 240, each comprised of sensors 114. One-dimensional correlation for each detector, e.g., 210 is even simpler than for the detector 100 illustrated in FIG. 1 because, in the case illustrated, only one vector, e.g., 253, is generated for each for each detector, e.g., 210. Expansion of image 140 is detectable simply by summing the vectors 250–253 resulting from each group, with positive values assigned to divergent vector directions and negative values assigned to convergent vector dimensions.

In the cases illustrated in FIGS. 1A and 2, the image 140 is for the most part centrally located on the detectors, e.g., 100. However, good results have been obtained even with images that are significantly off-center as well. For application as a time-to-contact estimator, it is found that results are fairly insensitive to image centering. As will be evident to one skilled in the art, a plurality of detectors, e.g., 100, may be dispersed around an image field (i.e., the field of vision) to increase the usable range of the field, as illustrated in FIGS. 1B, 1C, and 1D.

Figure 3:
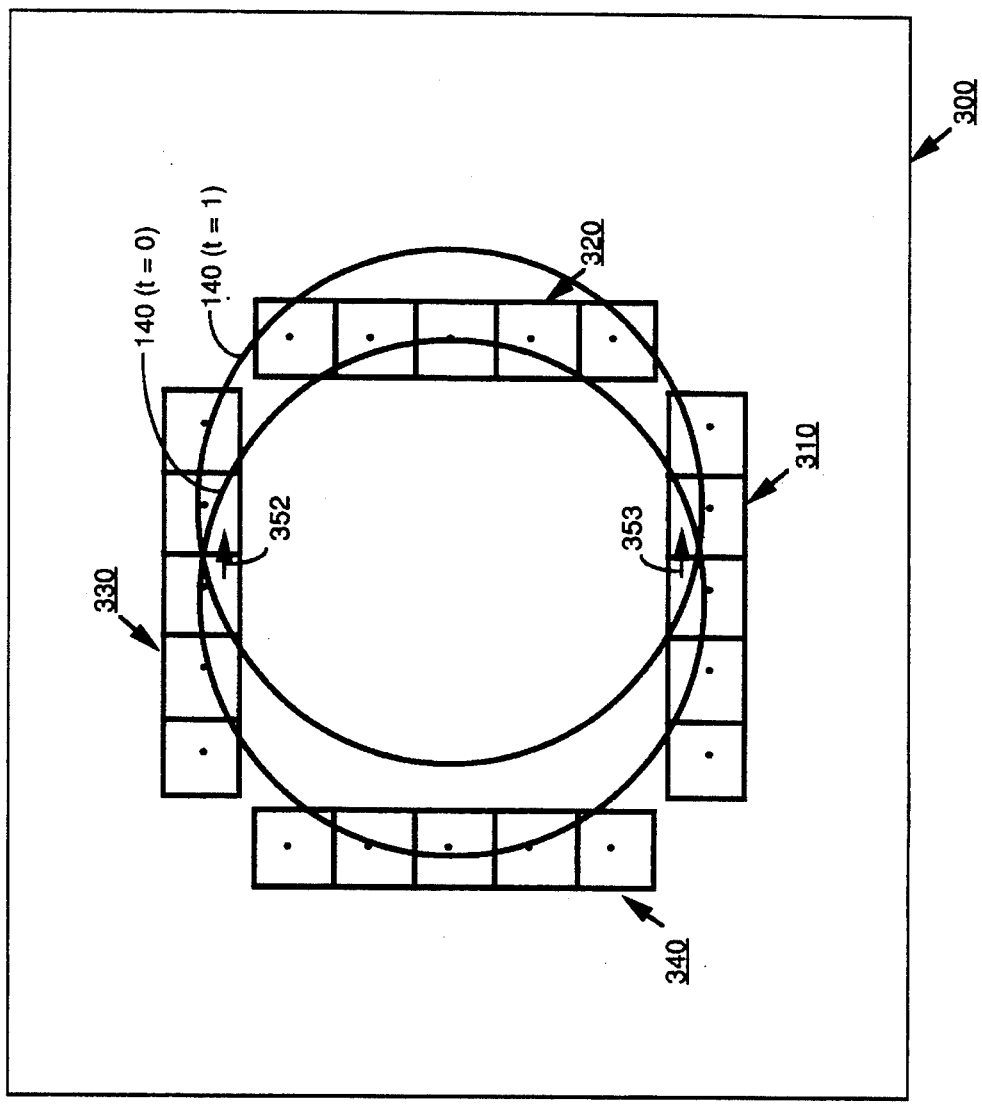
FIG. 3 illustrates a set of simplified one-dimensional detectors for measuring rotational or translational optical flow in accordance with the present invention.

Referring now to FIG. 3, an alternative array 300 is illustrated. Array 300 is made up of four individual one-dimensional detectors 310, 320, 330, 340, configured to be each substantially tangential to an expected FIG. 140. The geometry of detectors 310, 320, 330, 340 permits one-dimensional correlation to be used to detect translational movement, as shown in FIG. 3, or rotational movement. In operation, the brightness values for each detector, e.g., 310 are measured and stored at time t=0. At time t=1, the brightness values of the image 140 are again measured. Mathematical processing is then performed to determine a correspondence between image portions incident upon each detector, e.g., 310 at time t=0 and image portions incident upon that detector, e.g., 310 at time t=1. Vectors 352 and 353 are defined from these correspondences to indicate the direction and distance of the change of each image portion.

Since the correlation is one-dimensional, the direction of such vectors will be either horizontal or vertical, depending on whether the vectors come from image portions incident upon one of the vertical detectors 320, 340 or the horizontal detectors 310, 330. Translation of the image 140 such as that illustrated in FIG. 3 is indicated by horizontal vectors 352, 353 that are both in the same direction. Were image 140 not a circle, rotation of image 140 would be indicated by vectors that together would be generally clockwise or counterclockwise around the center of detector 300.

Figure 4:
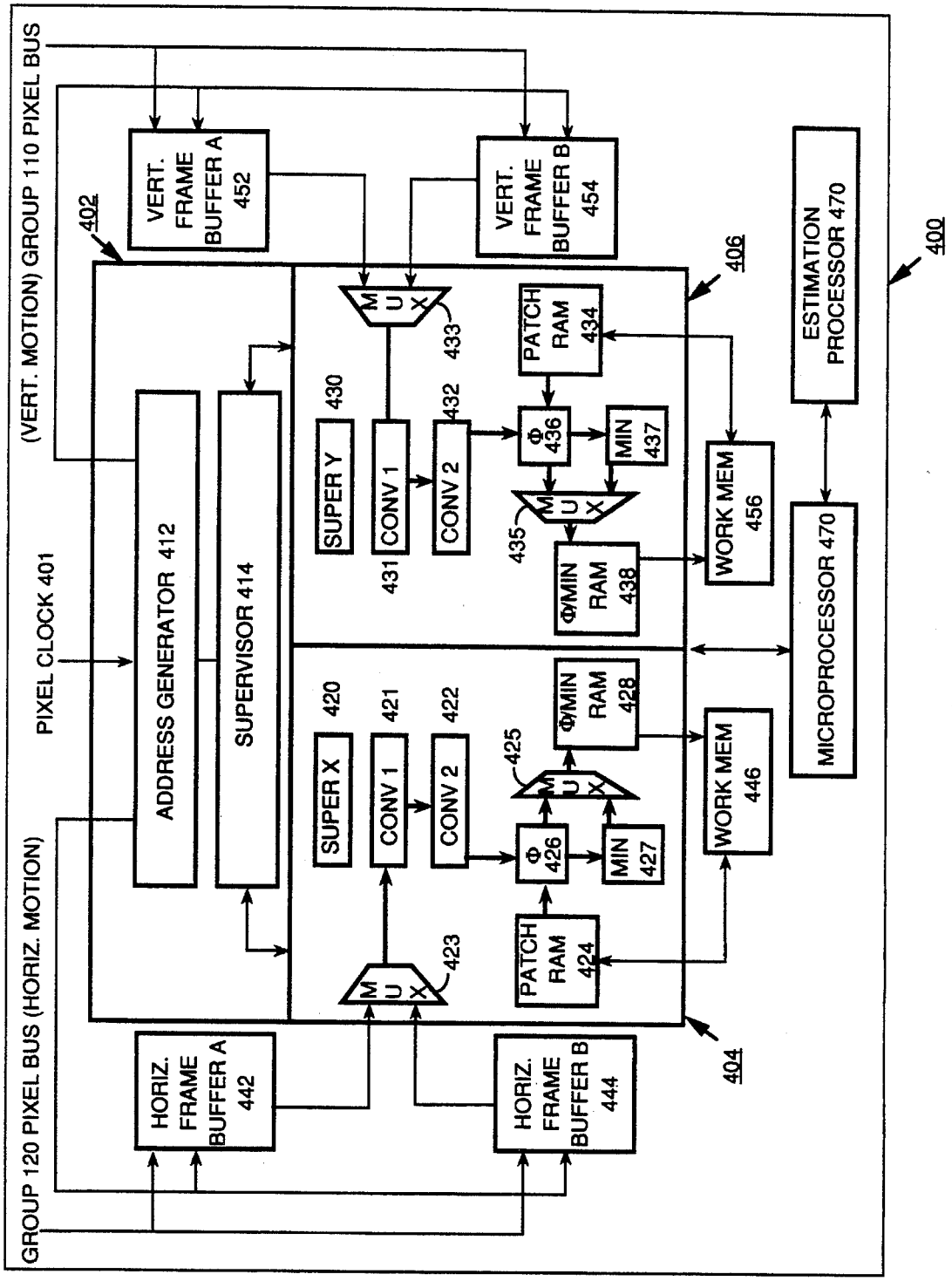
FIG. 4 is a block diagram of a circuitry to implement a time-to-contact estimator in accordance with the present invention.

Referring still to FIG. 1 and now also to FIG. 4, there is shown a circuit block diagram for a time-to-contact or movement estimator 400 using an array 1000 of detectors 100 as illustrated in FIG. 1B. Estimator 400 is made up of application-specific integrated circuitry 402, 404, 406 for controlling and interconnecting memories 442, 444, 446, 452, 454, 456 and microprocessor 470. Specifically, image data in pixel form from group 120 of detector 100 are applied to a group 120 pixel bus. Group 120 pixel bus processing corresponds to horizontal motion processing, while group 110 pixel bus processing corresponds to vertical motion processing. At time t=0, as defined by pixel clock signal 401, address generator 412 directs the group 120 pixel data to be stored in horizontal frame buffer A 442. At time t=1, address generator 412 directs group 120 pixel data to be stored in horizontal frame buffer B 444. Thus, at t=1 horizontal frame buffer B 444 stores current image information while horizontal frame buffer A 442 stores previous image information. At time t=2, address generator 412 directs new group 120 pixel data to be stored in horizontal frame buffer A 442, so at that time horizontal frame buffer A 442 will have current image information and horizontal frame buffer B 444 will have previous image information. Multiplexer 423 selects a patch from whichever frame buffer 442 or 444 is presently storing "current" information and applies it to processing block CONV 1 421, which converts two-dimensional patches to one-dimensional patches by convolving with a vertical motion filter according to the intermediate equation:

$$\hat{E}=(G_{\sigma_y}(y)*E) \quad \text{Eq. 1}$$

where G is the gaussian filter transfer function, E represents an array of image intensity values for a 512×512 pixel image patch, each pixel in the patch having an 8-bit value, $\hat{E}$ represents the image patch resulting from the filtering of Equation 1, $\sigma_y$ represents the standard deviation of the gaussian filter G in the y (vertical) dimension, and $G_{\sigma_y}(y)$ represents the gaussian filtering function as applied in the y dimension. The result of this convolution is applied to processing block CONV 2 422 where the one-dimensional patch output by CONV 1 421 is further convolved in one dimension with a second derivative "mask" according to the equation:

$$\hat{E}=(G_{\sigma_y}(y)*E)*G''_{\sigma_x}(x) \quad \text{Eq. 2}$$

where $\hat{E}$ now represents the re-filtered image array, and $\sigma_x$ represents the standard deviation of the Gaussian filter in the x (horizontal) dimension. In the preferred embodiment, the gaussian filter G is used to provide significant smoothing in the dimension orthogonal to the dimension for which the flow component is to be estimated. In the above example, the gaussian filter G is used to filter strongly in the y (vertical) dimension and very little in the x (horizontal) dimension, since flow information in the x dimension is desired.

A one-dimensional correlation function Φ 426 is then performed to compute a distance between portions of image 140 at times t=0 and t=1 by using as input (a) the output of CONV 2 422 representing the current image, and (b) corresponding data for the previous image, which is stored in patch RAM 424. The Φ function 426 generates distance values for every possible one-dimensional pixel shift between the current patch and the previous patch and stores the resulting distance value for each such shift in the Φ/MIN RAM 428 through multiplexer 425. The measure of distance used in the preferred embodiment is the conventional sum of the squares of the differences between values of corresponding pixels of the previous and current processed patches. MIN processor 427 determines the horizontal shift that minimizes the distance value (i.e., maximizes correlation), and this information is also stored in Φ/MIN RAM 428 through multiplexer 425.

A work memory 446 is used as needed to store intermediate results. When processing is complete, the current processed patch as output by CONV 2 422 is transferred to patch RAM 424 for the next time processing will be performed.

Identical processing to that of subsystem 404 for the x dimension occurs in subsystem 406 for the y dimension. Specifically, at time t=0, as defined by pixel clock signal 401, address generator 412 directs the group 110 pixel data to be stored in vertical frame buffer A 452. At time t=1, address generator 412 directs group 110 pixel data to be stored in vertical frame buffer B 454. Multiplexer 433 selects a patch from whichever frame buffer 452 or 454 is presently storing "current" information and applies it to processing block CONV 1 431, which converts two-dimensional patches to one-dimensional patches by convolving with a horizontal motion filter according to the intermediate equation:

$$\hat{E} = (G_{\sigma_x}(x) * E \qquad \text{Eq. 3}$$

where G is the gaussian filter transfer function, E represents an array of image intensity values for a 512×512 pixel image patch, each pixel in the patch having an 8-bit value, $\hat{E}$ represents the image patch resulting from the filtering of Equation 3, $\sigma_x$ represents the standard deviation of the gaussian filter G in the x (horizontal) dimension, and $G_{\sigma_x}(x)$ represents the gaussian filtering function as applied in the x dimension. The result of this convolution is applied to processing block CONV 2 432 where the one-dimensional patch output by CONV 1 431 is further convolved in one dimension with a second derivative "mask" according to the equation:

$$\hat{E} = (G_{\sigma_x}(x) * E) * G''_{\sigma_y}(y) \qquad \text{Eq. 4}$$

where $\hat{E}$ now represents the re-filtered image array, and $\sigma_y$ represents the standard deviation of the Gaussian filter in the y (vertical) dimension. In the preferred embodiment, the gaussian filter G is used to provide significant smoothing in the dimension orthogonal to the dimension for which the flow component is to be estimated. In the above example, the gaussian filter G is used to filter strongly in the x (horizontal) dimension and very little in the y (vertical) dimension, since flow information in the y dimension is desired.

A one-dimensional correlation function Φ 436 is then performed to compute a distance between portions of image 140 at times t=0 and t=1 by using as input (a) the output of CONV 2 432 representing the current image, and (b) corresponding data for the previous image, which is stored in patch RAM 434. The Φ function 436 generates distance values for every possible one-dimensional pixel shift between the current patch and the previous patch and stores the resulting distance value for each such shift in the Φ/MIN RAM 438 through multiplexer 435. MIN processor 437 determines the vertical shift that minimizes the distance value (i.e., maximizes correlation), and this information is also stored in Φ/MIN RAM 438 through multiplexer 435.

A work memory 456 is used as needed to store intermediate results. When processing is complete, the current processed patch as output by CONV 2 432 is transferred to patch RAM 434 for the next time processing will be performed. Processing then continues for subsequent patches as described above.

SUPERVISOR 414, SUPER X 420 and SUPER Y 430 represent supervisory functionality to control and coordinate the operation of estimator 400 as described above. Microprocessor 470 performs the processing for estimator 400 as directed by instructions stored in the circuitry 402, 404, 406. In a preferred embodiment, RAMs 442, 444, 446, 452, 454, 456 are implemented using conventional 256 kByte, 20 ns access time random access memory, and microprocessor 470 is a conventional device such as a TRANSPUTER model T800 operating at a clock frequency of 25 MHz.

The results of the processing in modules 404 and 406 are applied to estimation processor 475 through microprocessor 475 in order to obtain estimates of time-to-contact, translation, or rotation. Specifically, the correlation information described above provides an indication of optical flow over time that may be used to estimate movement. In the preferred embodiment, conventional processing is applied to the correlation information, as described, for example, in MASSACHUSETTS INSTITUTE OF TECHNOLOGY ARTIFICIAL INTELLIGENCE LABORATORY MEMO NO. 1289 incorporated by reference above and in the references cited therein, to yield such estimates. Estimation processor 475 is implemented in the preferred embodiment by a conventionally programmed personal computer.

The sparse information used in the estimator 400 discussed above has proven to be sufficient for time-to-contact applications, and such limited information might also provide a sufficient description of the flow of image 140 for other applications as well. Therefore, in another aspect of the present invention, a compressed representation of an image flow may be achieved using the one-dimensional correlation described above. This correlation information may be transmitted to a remote location more efficiently than would be possible using the complete bit-map or other representation of image 140.

Therefore, a computationally simple one-dimensional correlation permits faster and more efficient processing of image information and estimation of is image expansion, rotation, or translation, as well as time-to-contact. The above description is included to illustrate the operation of preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A system for predicting a time to contact of a first object moving towards a second object, comprising:

sensing means affixed to said first object for sensing a two-dimensional plurality of image portions of said second object, said sensing means including a first group of sensors and a second group of sensors, the first group of sensors not being collinear with the second group of sensors;

a first memory coupled to said sensing means for storing said sensed image portions at a first instant of time;

a second memory coupled to said sensing means for storing said sensed image portions at a second instant of time;

a correlator coupled to said first and second memories for estimating one-dimensional optical flows by performing correlations on said sensed image portions at said first instant of time and said sensed image portions at said second instant of time, a first one of said correlations corresponding to a first component of said image portions incident on said first group of sensors and a second one of said correlations corresponding to a second component of said image portions incident on said second group of sensors; and an estimator, coupled to said correlator, for generating an estimate of said time to contact in response to results of said correlations by said correlator.

2. A system for predicting a time to contact of a first object moving towards a second object, comprising:

a plurality of sensing means affixed to said first object, each of said sensing means sensing a one-dimensional plurality of image portions of said second object, at least two of said sensing means not being collinear:

a first memory coupled to said plurality of sensing means for storing said sensed image portions at a first instant of time;

a second memory coupled to said plurality of sensing means for storing said sensed image portions at a second instant of time;

a correlator coupled to said first and second memories for estimating one-dimensional optical flows by performing correlations on said sensed image portions at said first instant of time and said sensed image portions at said second instant of time, each of such correlations being responsive to one of said image portions incident on a corresponding one of said sensing means; and an estimator, coupled to said correlator, for generating an estimate of said time to contact in response to results of said correlations by said correlator.

3. A system as in claim 1, wherein said first and second groups of sensors comprise two orthogonally configured rows of optical detectors.

4. A system as in claim 2, wherein said sensing means comprises a plurality of rows of optical detectors, said plurality of rows defining a plane.

5. A system as in claim 1, said correlator further comprising a gaussian filter, said gaussian filter adapted to accept as input said sensed image portions stored in said first and second memories and to produce therefrom filtered image portion signals for application to said correlator, the correlator operating according to the convolution formula:

$$\hat{E} = (G_{\sigma_y}(y) * E) * G''_{\sigma_x}(x)$$

where $\hat{E}$ is an array of said filtered image portion signals, E is an array of said sensed image portions stored in said first and second memories, G is the gaussian filter transfer function, G" is a second derivative of G, $\sigma_y$ is a standard deviation of the gaussian filter in the y dimension, and $\sigma_x$ is a standard deviation of the gaussian filter in the x dimension.

6. A system as in claim 2, said correlator further comprising a gaussian filter, said gaussian filter adapted to accept as input said sensed image portions stored in said first and second memories and to produce therefrom filtered image portion signals for application to said correlator, the correlator operating according to the convolution formula:

$$\hat{E} = (G_{\sigma_y}(y) * E) * G''_{\sigma_x}(x)$$

where $\hat{E}$ is an array of said filtered image portion signals, E is an array of said sensed image portions stored in said first and second memory means, G is the gaussian filter transfer function, G" is a second derivative of G, $\sigma_y$ is a standard deviation of the gaussian filter in the y dimension, and $\sigma_x$ is a standard deviation of the gaussian filter in the x dimension.

* * * * *